UNITED STATES PATENT OFFICE.

CLAUDE A. O. ROSELL, OF NEW YORK, N. Y., ASSIGNOR TO THE AMERICAN LITHOGRAPHIC COMPANY, OF NEW YORK.

PRINTING-SURFACE.

SPECIFICATION forming part of Reissued Letters Patent No. 11,818, dated April 10, 1900.

Original No. 637,553, dated November 21, 1899. Application for reissue filed December 22, 1899. Serial No. 741,344.

*To all whom it may concern:*

Be it known that I, CLAUDE A. O. ROSELL, a citizen of the United States, and a resident of the city, county, and State of New York, have invented certain new and useful Improvements in Printing-Surfaces, of which the following is a specification.

The invention relates to planographic printing, and has special reference to the character or construction of the printing plate or device to be used in such planographic printing; and it consists of the improved printing form or device herein shown and claimed.

The invention has especial applicability and usefulness in connection with rounded or cylindrical printing-forms and will be more especially described in that connection. More particularly it has in view the repeated preparation of a given planographic-printing form or device with a new fresh printing-surface for each new printing-job and without undulations or unevenness, and this repeated production of fresh printing-surfaces while accurately maintaining the special form, size, diameter, &c., of the printing-form as a whole with reference to the coöperating parts of the press.

In planographic cylinder-printing two methods have been used or suggested. In one a thin flexible sheet of aluminium or zinc is bent around a cylinder and is fastened there in place by suitable mechanical means, and the printing is effected from such sheet so cylindrically held and supported. In the other zinc is electrolytically deposited upon a cylinder of copper, and the printing is effected from the zinc surface thus deposited. In the former case the mechanical incidents and difficulties accompanying the application and holding of the flexible sheets, as well as the expenses incidental to preparing the face of those sheets for printing purposes, as by sand-blasting, have constituted controlling obstacles to extended success. In the latter case after an edition has been printed the purpose has been to remove the zinc printing-surface by means of nitric acid; but the nitric acid in this operation has the disadvantage of removing also a notable amount of copper, thereby gradually diminishing the diameter of the copper cylinder and, moreover, diminishing it unevenly, a feature which interferes with and prevents the uniform taking of ink and water from the ink and water rollers, respectively, and also prevents the proper printing of the same. Moreover, any notable diminution in the diameter of the printing-cylinder would interfere and prevent the proper coöperation of that cylinder with the other parts of the printing-press, and register would gradually be interfered with and would finally be rendered impossible to attain without reconstruction of the entire press. These difficulties are overcome in the following manner:

In the preferred form of my invention I prepare a copper cylinder, which may be a hollow shell adapted to be seated upon an interior and supporting mandrel or device and to be adjusted thereon or removed therefrom when desired, or it may be a solid copper cylinder or otherwise. It is finished on its outer surface with great accuracy and care in regard to uniformity of surface, exactness of dimensions, &c., all with reference to the exact size and shape of printing-form desired in the press. I then electrolytically plate this copper cylinder with silver, imparting a sufficient thickness of coating to protect the underlying copper from the acid or alkaline reagent to be subsequently used, as hereinafter explained. A thickness of about four ounces to the square foot will be sufficient for this purpose. To increase the resisting power of this protective coating, it should preferably be burnished. Upon this protective coating of silver a zinc printing-surface is electrolytically deposited in such a way as while causing such zinc surface to be an integral part of the composite form shall at the same time render it sufficiently porous and of the necessary surface character to adapt it to act as a lithographic or planographic printing-surface. After the use of the surface for printing purposes and the removal of the ink of the transfer in the usual way, as with turpentine, &c., the entire zinc coating is removed by means of caustic soda or potash. For this purpose sulfuric acid or hydrochloric acid may also be used, either alone or after a preliminary treatment of the zinc surface with caustic soda. In this way the zinc printing-surface will be wholly removed, and the silver surface will be exposed and bright, but without being itself in any way affected or modified or removed and will immediately be ready to receive a fresh deposit of zinc for a second operation or edition. Thus the printing form or surface consists for each printing-job of a new fresh outer coating or printing-face of electrolytically-deposited zinc and suitable for planographic printing, but adapted to be itself removed by a suitable acid or alkaline reagent after the printing is finished, and a base of suitable material integral with the outer printing coating or surface, the base having a protective coating or face of silver underlying the printing-surface. In this way and by the application each time of a thin printing-surface of uniform and predetermined thickness the resulting printing form or device is always permanently of the exact shape and size fitting it to coöperate permanently with the other portions of the printing-press. Moreover, as all the wear of the printing operation is on the outer coating or face, which is wholly removed and a new fresh surface applied to each new printing-job, a printing-cylinder prepared as above is practically indestructible, so that its permanence more than counterbalances its initial cost.

Although specifically described with reference to cylinder-printing, where the invention has peculiar usefulness and advantages, and especially in connection with multicolor cylinder-printing, it nevertheless applies equally well to printing from flat or curved surfaces of any shape.

What I claim as new, and desire to secure by Letters Patent, is—

1. A lithographic-printing form composed of a metallic base, a protective coating thereon of silver, the base with said protective coating being as a whole of non-varying shape and dimensions, thus permanently adapting the printing-form as a whole to the coöperating parts of the press, and an outer planographic-printing surface of electrolytically-deposited zinc, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

2. A lithographic-printing form composed of a metallic base, a burnished protective coating thereon of silver, the base with said protective coating being as a whole of non-varying shape and dimensions, thus permanently adapting the printing-form as a whole to the coöperating parts of the press, and an outer planographic-printing surface of electrolytically-deposited zinc, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

3. A cylindrical lithographic-printing form composed of a metallic base, a protective coating thereon of silver, the base with said protective coating being as a whole of non-varying shape and dimensions, thus permanently adapting the printing-form as a whole to the coöperating parts of the press, and an outer planographic-printing surface of electrolytically-deposited zinc, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

4. A cylindrical lithographic-printing form composed of a metallic base, a burnished protective coating thereon of silver, the base with said protective coating being as a whole of non-varying shape and dimensions, thus permanently adapting the printing-form as a whole to the coöperating parts of the press, and an outer planographic-printing surface of electrolytically-deposited zinc, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

5. A lithographic-printing form composed of a metallic base of copper, a protective coating thereon of silver, the base with said protective coating being as a whole of non-varying shape and dimensions, thus permanently adapting the printing-form as a whole to the coöperating parts of the press, and an outer planographic-printing surface of electrolytically-deposited zinc, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

6. A cylindrical lithographic-printing form composed of a metallic base of copper, a protective coating thereon of silver, the base with said protective coating being as a whole of non-varying shape and dimensions, thus permanently adapting the printing-form as a whole to the coöperating parts of the press, and an outer planographic-printing surface of electrolytically-deposited zinc, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

7. A lithographic-printing form composed of a metallic base, a protective coating thereon of silver, the base with said protective coating being as a whole of non-varying shape and dimensions, thus permanently adapting the printing-form as a whole to the coöperating parts of the press, and an outer planographic-printing surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

8. A lithographic-printing form composed of a metallic base, a protective coating thereon of silver, the base with said protective coating being as a whole of non-varying shape and dimensions, thus permanently adapting the printing-form as a whole to the coöperating parts of the press, and an outer planographic-printing surface of electrolytically-deposited metal, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

9. A lithographic-printing form comprising a silver protective face of non-varying shape and an outer planographic-printing surface, said surface having a design upon it suitably developed and being thereby adapted to print lithographically, said surface being also adapted to be thereafter wholly removed by a suitable reagent not acting on the protective face, the protective face and the printing-surface being integrally united together, substantially as described.

10. A lithographic-printing form comprising a silver protective face of non-varying shape and an outer planographic-printing surface of electrolytically-deposited metal, said surface having a design upon it suitably developed and being thereby adapted to print lithographically, said surface being also adapted to be thereafter wholly removed by a suitable reagent not acting on the protective face, the protective face and the printing-surface being integrally united together, substantially as described.

11. A lithographic-printing form comprising a silver protective face of non-varying shape and an outer planographic-printing surface of electrolytically-deposited zinc, said surface having a design upon it suitably developed and being thereby adapted to print lithographically, said surface being also adapted to be thereafter wholly removed by a suitable reagent not acting on the protective face, the protective face and the printing-surface being integrally united together, substantially as described.

In testimony whereof I have signed my name to this specification in the presence of two subscribing witnesses.

CLAUDE A. O. ROSELL.

Witnesses:

EDWIN SEGER,

SIDNEY MANN.